(12) United States Patent
Tse

(10) Patent No.: US 6,505,706 B2
(45) Date of Patent: Jan. 14, 2003

(54) EXHAUST FLOW GUIDE FOR JET NOISE REDUCTION

(75) Inventor: Man-Chun Tse, Brossard (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 09/879,988

(22) Filed: Jun. 14, 2001

(65) Prior Publication Data

US 2002/0189896 A1 Dec. 19, 2002

(51) Int. Cl.[7] .................................................. F01N 1/00
(52) U.S. Cl. .............................. 181/213; 84/214; 84/215
(58) Field of Search ............................. 181/213, 215, 181/214, 216; 239/265.13, 265.17, 265.19

(56) References Cited

U.S. PATENT DOCUMENTS

| | | | |
|---|---|---|---|
| 3,565,208 A | | 2/1971 | Millman ...................... 181/33 |
| 3,568,792 A | * | 3/1971 | Urquhart ............... 239/265.13 |
| 3,820,626 A | | 6/1974 | Bonneaud et al. |
| 3,964,568 A | | 6/1976 | Neumann |
| 4,117,671 A | * | 10/1978 | Neal et al. ..................... 60/262 |
| 4,137,992 A | * | 2/1979 | Herman ....................... 181/213 |
| 4,161,231 A | | 7/1979 | Wilkinson ................... 181/292 |
| 4,284,170 A | | 8/1981 | Larson et al. |
| 4,372,110 A | * | 2/1983 | Cheng |
| 4,786,016 A | | 11/1988 | Presz, Jr. et al. |
| 5,491,307 A | | 2/1996 | Wiezien |
| 5,717,172 A | | 2/1998 | Griffin, Jr. et al. |
| 5,721,402 A | * | 2/1998 | Parante ....................... 181/214 |
| 5,761,900 A | | 6/1998 | Presz, Jr. ..................... 60/262 |
| 5,943,856 A | * | 8/1999 | Lillibridge et al. |
| 6,112,850 A | | 9/2000 | Secrest et al. |

FOREIGN PATENT DOCUMENTS

| | | | |
|---|---|---|---|
| EP | 0 913 567 A2 | 8/1998 | ............. F02K/1/40 |
| EP | 0 984 152 A2 | 9/1999 | ............. F02K/1/46 |
| GB | 2089434 | 12/1980 | ............. F02K/1/82 |

\* cited by examiner

*Primary Examiner*—Robert E. Nappi
(74) *Attorney, Agent, or Firm*—Wayne H. Yan; Ogilvy Renault

(57) ABSTRACT

A gas turbine engine includes an exhaust flow guide attached to the engine exhaust end. The exhaust flow guide is made of a piece of sheet metal curved about the central longitudinal axis of the engine to form a partial portion of a nozzle having curved leading and trailing edges, and side edges. The exhaust flow guide asymmetrically affects the downstream jet noise contribution volume of the exhaust gases discharged from the engine exhaust end to change the jet noise directivity and reduce its power level. The exhaust flow guide can further include additional features such as perforations, corrugated surfaces, reinforcing strips and irregularly shaped trailing edges to further improve the mixing of exhaust gas flow with surrounding fluid flow to further reduce the downstream jet noise contribution volume, thereby resulting in jet noise reduction. The exhaust flow guide according to the present invention also improves attenuation of engine noise generated in the engine and emitted from the engine exhaust end. The present invention provides a jet noise reduction device which is simple and economical to manufacture and maintain, and is applicable to both short and long cowl nacelle gas turbine engines.

20 Claims, 6 Drawing Sheets

US 6,505,706 B2

EXHAUST FLOW GUIDE FOR JET NOISE REDUCTION

FIELD OF THE INVENTION

The present invention relates to the suppression of gas turbine engine noise, and more particularly to an exhaust flow guide for aero-engine exhaust jet noise reduction.

BACKGROUND OF THE INVENTION

Noise has been a significant negative factor associated with the commercial airline industry since the introduction of the aircraft gas turbine engine. Considerable effort has been directed toward quieting aircraft engines.

Aero-engine exhaust jet noise is a dominant noise source of aircraft gas turbine engines at high power settings, for example, during a flight take-off operation. Jet noise is not generated within the gas turbine engine, but is caused by turbulence resulting from large velocity gradients produced by viscous shearing of rapidly moving gases as they are exhausted into the relatively quiescent surrounding atmosphere at the boundary between the exhaust gases and the atmosphere. Since the acoustic gas power is exponentially related to the velocity of the exhaust gases, that is, proportional to $V^8$, decreasing the velocity of the exhaust gases prior to discharge into the atmosphere substantially reduces the exhaust jet acoustic power.

In comparison with early turbine engines, modern gas turbine engines have reduced jet noise significantly. Many types of modern gas turbine engines are of the mixed flow variety, wherein, a primary fluid stream is mixed with a secondary fluid stream prior to discharge of the exhaust fluid into the outer atmosphere, as a common thrust-producing mixed flow fluid stream. Generally, the primary fluid stream consists of the high velocity, high temperature exhaust gases flowing from the turbine stage of the core engine and the secondary fluid stream consists of air or gas at a lower temperature and velocity, for example, from the engine fan stage through an annular bypass duct surrounding the core engine. As is well known in the art, such a mixed flow has two beneficial effects. First, engine thrust is improved since the mixed gases have a higher mass-velocity product than that of the turbine exhaust gases alone. Secondly, the noise level is reduced due to the mixed gases having a lower velocity than the velocity of the turbine exhaust gases.

Arrangements for mixing the core engine exhaust gases with bypass flow are well known in the art. The prior art mixers are effective in reducing the overall jet noise, nevertheless the prior art mixers are generally used with gas turbine engines having a long cowl nacelle which extends downstream of a core engine exhaust so that the mixing action generally occurs within the nacelle duct at the downstream end section. It is not popular to use the prior art mixer with gas turbine engines having a short cowl nacelle because the core engine extends downstream of the nacelle outlet and the air flow discharged from the bypass duct is mixed with unbounded air before reaching the core engine exhaust end.

The viscous shearing of the rapidly moving exhaust gases, even after being mixed with bypass duct air flow by the mixer, discharged into the relative quiescent surrounding unbounded air, still produces a turbulence region immediately downstream of the exhaust end of the gas turbine engine, effectively, along a longitudinal length of up to twenty times the diameter of the exhaust end of the gas turbine engine. This turbulence region produces the substantial proportion of exhaust jet noise and is called the jet noise contribution volume. Efforts have been made to effect a better mixing of engine exhaust gases in order to reduce the jet noise contribution volume, thereby resulting in exhaust jet noise reduction.

U.S. Pat. No. 4,786,016, issued to Presz, Jr. et al. on Nov. 22, 1988 discloses a casing surrounding a fluid stream over which an unbounded fluid flows in a downstream direction having a plurality of alternating, adjoining troughs and ridges in its external surface, extending in the downstream direction to a thin trailing edge of the casing, which will thereby have a wave-like shape. According to Presz, Jr. et al. this type of casing structure which can be applied to both long cowl nacelle and short cowl nacelle gas turbine engines and to both a nacelle outlet and a core engine exhaust nozzle, is used to prevent or reduce the area of a stream-wise two-dimensional boundary layer separation on the external surface of the casing, and thereby reducing the surface drag. Nevertheless, the wave-like shaped casing structure is similar to the prior art mixers and promotes the mixing of the fluid flow discharged from the casing within the surrounding unbounded air. Thus, the wave-like shaped casing structure will reduce exhaust jet noise as well, when formed as an air end section of a gas turbine engine or the exhaust end of a core engine.

The Applicant has developed a gas turbine exhaust jet noise reduction assembly for a gas turbine engine, which is described in the Applicant's co-pending U.S. patent application Ser. No. 09/737,599, filed on Dec. 18, 2000. The assembly includes an exhaust shroud having a tubular wall extending between a forward end and an aft end, adapted to be affixed to the gas turbine engine exhaust and for discharging engine exhaust gases without substantial blockage thereto. The assembly has perforations formed in the shroud wall for fluid communication between regions at both sides of the shroud wall, thereby resulting in fluid flow across the shroud wall to enhance mixing of the engine exhaust gases with a surrounding fluid flow.

Another example of efforts toward engine jet noise reduction is described in U.S. Pat. No. 5,491,307, issued to Wlezien on Feb. 13, 1996. Wlezien describes a single expansion ramp extending from the exhaust opening of a fluid nozzle which is capable of exhausting supersonic fluid flow which forms standing shock waves generating noise. The ramp has a face lying adjacent the supersonic fluid flow and holes which pass through the face and entirely through the ramp. The face has a porosity of at least 4% so that compression waves are created in the supersonic fluid flow and the amplitude of the noise is decreased. The expansion ramp however, does not reduce the jet shear noise generated by the shear layer between the jet exhaust and the ambient flow.

It is desirable to develop more effective new and alternative devices for aero-engine exhaust jet noise reduction, particularly for reducing the jet shear noise generated by the shear layer between the jet exhaust and the ambient flow. It is also desirable to have new and alternative devices for aero-engine exhaust jet noise reduction that are simple to manufacture and maintain, and are applicable to different types of gas turbine engines.

SUMMARY OF THE INVENTION

It is one object of the present invention to provide a device for effectively suppressing aero-engine exhaust jet shear noise.

It is another object of the present invention to provide a gas engine exhaust jet noise reduction device that is simple to manufacture and maintain.

It is yet another object of the present invention to provide a gas engine exhaust jet noise reduction device applicable to gas turbine engines having either a short cowl nacelle or a long cowl nacelle.

It is a further object of the present invention to provide a device to change jet noise directivity and reduce its power level.

It is a still further object of the present invention to provide a device to enhance mixing of the engine exhaust gases with surrounding fluid flow, thereby reducing the jet noise contribution volume.

It is a still further object of the present invention to provide a method of reducing exhaust jet shear noise by asymmetrically guiding engine exhaust flow to change the noise directivity and reduce its power level.

In general terms the jet noise directivity of a gas turbine engine is changed and the jet noise power levels are reduced by means of an exhaust flow guide made of a curved sheet metal attached to an engine exhaust end to form a partial portion of a nozzle to asymmetrically affect the viscous shearing of rapidly moving exhaust gases into a relatively quiescent surrounding fluid flow at the boundary between the exhaust gases and the surrounding fluid flow.

In accordance with another aspect of the present invention, there is a gas engine exhaust jet noise reduction device provided for a gas turbine engine having an exhaust end. The device comprises an exhaust flow guide adapted to be attached to the exhaust end. The exhaust flow guide has a piece of sheet metal curved to form a partial portion of a nozzle having curved leading and trailing edges, and side edges. The curved leading edge has a circumferential length greater than a circumferential length of the curved trailing edge. A distance from a central point of the curved leading edge to an imaginary straight line extending between two circumferentially opposed extremities of the curved leading edge is greater than one quarter of a diameter of an inner periphery of the exhaust end. Thus, the exhaust flow guide asymmetrically guides an exhaust flow to change a jet noise directivity and reduce jet noise power levels.

It is preferable that a distance from the central point of the curved leading edge of the exhaust flow guide to a center point of the curved trailing edge of the exhaust flow guide is not smaller than 0.3 of the diameter of the inner periphery of the exhaust end. The piece of sheet metal is preferably in a trapezoidal shape or a triangular shape. In the latter case, the length of the trailing edge is actually reduced to a point.

The piece of sheet metal forming the exhaust flow guide, according to one embodiment of the present invention is attached to and extends rearwards from the engine exhaust, and is curved about a central longitudinal axis of the engine to form a partial portion of a nozzle. The center point of the curved leading edge of the exhaust flow guide is positioned circumferentially adjacent to a lowest point of the inner periphery of the exhaust end when the aircraft having the gas turbine engine is grounded. The exhaust flow guide is preferably formed in a shape and attached to the exhaust end, forming a smooth continuation of a nacelle exhaust nozzle of the gas turbine engine. Thus, the exhaust flow guide is preferably formed as a partial portion of a substantially cylindrical nozzle or a partial portion of a truncated conical nozzle, depending on the shape of the nacelle exhaust nozzle to which the exhaust flow guide is attached.

The exhaust flow guide according to another embodiment of the present invention can be attached to both the engine exhaust end and a fan bypass nacelle outlet to asymmetrically affect both the engine exhaust gas flow and the bypass air flow discharged by the fan bypass nacelle outlet.

Other advantages and features of the present invention will be better understood with reference to preferred embodiments of the present invention described hereinafter.

BRIEF DESCRIPTION OF THE DRAWINGS

Having thus generally described the nature of the present invention, reference will now be made to the accompanying drawings, showing by way of illustration the preferred embodiments thereof, in which.

DETAILED DESCRIPTION OF THE PREFERRED EMBODIMENTS

Figure 1:
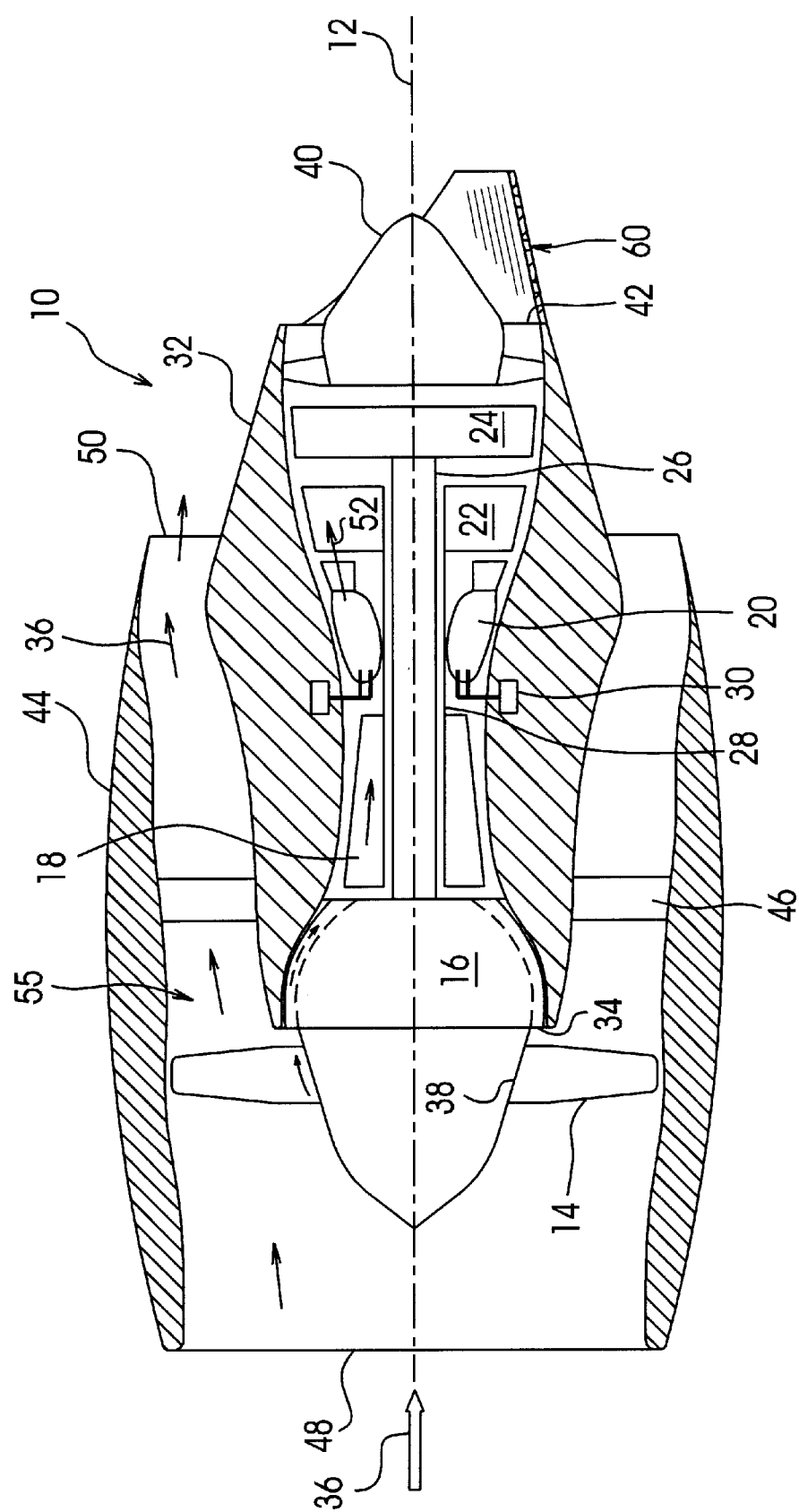
FIG. 1 is a longitudinal cross-sectional schematic view of a gas turbine engine having a short cowl nacelle, incorporating the present invention.

Referring to the drawings, particularly FIG. 1, an exemplary gas turbine engine 10 includes in serial flow communication about a longitudinal center axis 12, a fan assembly having a plurality of circumferentially spaced fan or rotor blades 14, a conventional low pressure compressor 16, a conventional high pressure compressor 18, a conventional annular combustor 20, a conventional high pressure turbine 22 and a conventional low pressure turbine 24. The low pressure turbine 24 is securely connected to both the low pressure compressor 16 and the fan blades 14 by a first rotor shaft 26, and the high pressure turbine 22 is securely connected to the high pressure compressor 18 by a second rotor shaft 28. Conventional fuel injecting means 30 are provided for selectively injecting fuel into the combustor 20 for powering the engine 10.

A conventional annular casing 32 surrounds the engine 10 from the low pressure compressor 16 to the low pressure turbine 24, and defines with the low pressure compressor 16, a low pressure compressor inlet 34 for receiving a portion of ambient air 36 thereof. The downstream end of the casing 32 defines with a conventional annular exhaust plug 40 an annular exhaust outlet 42. A portion of the air 36 compressed by the fan blades 14 adjacent to the blade roots 38 is further compressed by the low pressure compressor 16 and the high pressure compressor 18 and forced into the combustor 20. The mixture of the compressed air 36 and fuel injected by the fuel injecting means 30 generate combustion gases 52. The combustion gases 52 cause the high pressure turbine 22 and the low pressure turbine 24 to rotate respectively for powering the high pressure compressor 18, the low pressure compressor 16 and the fan blades 14. Surrounding the blades 14 and the upstream portion of the casing 32 is a short cowl nacelle 44 which is spaced radially outwardly from the casing 32 to define with the casing 32, an annular duct 55 for permitting the radially outer portion of the air 36 compressed by the fan blades 14 to bypass the engine 10. A plurality of circumferentially spaced stator veins 46 extend radially between the casing 32 and the nacelle 44, and are spaced apart axially downstream of the fan blades 14. The nacelle 44 includes an inlet 48 at its upstream end for receiving the ambient air 36 and an outlet 50 for discharging the portion of the air 36 which is compressed by the fan blades 14 and passed over the stator veins 46, for providing a portion of a thrust.

The air flow 36 discharged from the outlet 50 of the bypass duct 55 is directed to mix with the combustion gases 52 discharged from the exhaust outlet 42 of the engine 10 to form the jet exhaust. This will produce a higher mass-velocity product than the combustion gases 52 alone resulting in improved engine thrust, and will achieve lower flow velocity of the jet exhaust than the velocity of the combustion gases 52, thereby reducing jet engine noise levels.

In order to further reduce the exhaust jet noise, an exhaust flow guide 60 is attached to the exhaust outlet 42 of the engine 10. The exhaust flow guide 60, is made of a piece of sheet metal extending rearwards from the engine exhaust outlet 42 and being curved about the central longitudinal axis 12 of the engine 10 to form a partial portion of a nozzle. One embodiment of the exhaust flow guide 60, as more clearly shown in FIG. 6a, includes curved leading and trailing edges 64, 66, and side edges 68.

In operation, the compressed air 36 discharged from the outlet 50 of the bypass duct 55 is mixed with surrounding unbounded air before reaching the exhaust outlet 42 of the engine 10. However, the longitudinal distance from the outlet 50 of the bypass duct 55 to the exhaust outlet 42 of the engine 10 is limited and the diameter of the bypass duct 55 is relatively large, so that only a small outer portion of the annular bypass air flow 36 is mixed with the surrounding unbounded air. The major inner portion of the annular bypass air flow 36 remains unmixed when it reaches the exhaust outlet 42 of the engine 10. The combustion gases 52 discharged from the exhaust outlet 42 of the engine 10 directly contact the surrounding bypass air flow 36 so that the viscous shearing of the two fluid flow layers occurring at the boundary thereof produces the jet noise contribution volume of the engine exhaust gases, which is the major jet noise source and generates jet noise outside of the engine 10.

The exhaust flow guide 60 will asymmetrically affect the formation of the jet noise contribution volume of the engine exhaust gases, thereby changing the noise directivity and its power levels. This will be explained with reference to FIGS. 2 through 5.

Figure 2:
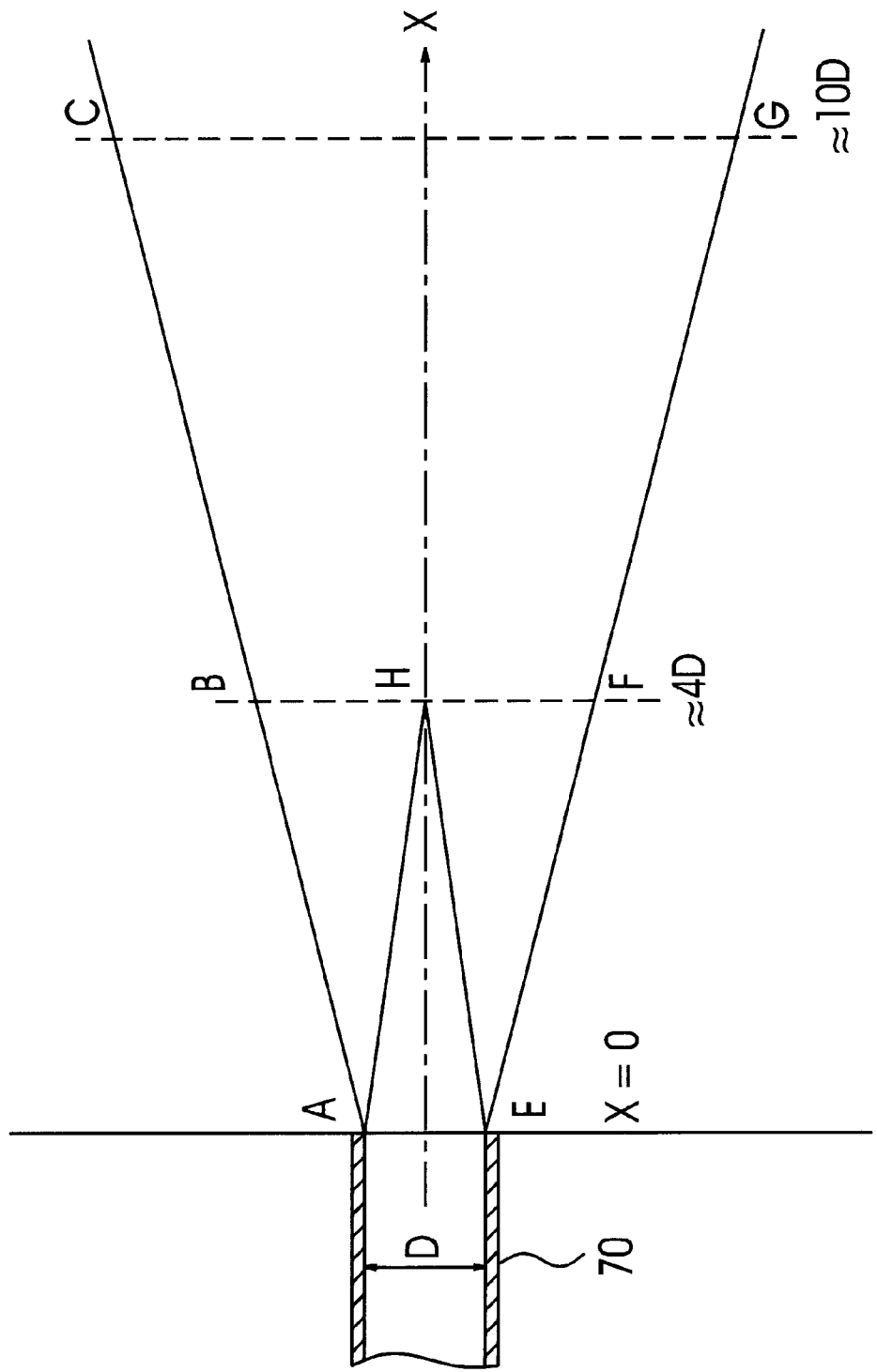
FIG. 2 is a schematic illustration, showing a downstream jet noise contribution volume of exhausted gases discharged from an engine exhaust end.

FIG. 2 schematically illustrates the formation of a jet noise contribution volume of engine exhaust gases discharged from a prior art symmetrical nozzle 70. The jet exhaust gases discharged from the engine nozzle 70 are mixed with surrounding air flow, and the mixing generally occurs in the two triangular areas ABH and EHF, called the mixing region. The jet exhaust gases in the core jet region defined by the triangular area AHE remain unmixed. The mixing action produces turbulence and the turbulence is maintained with fairly strong energy at the turbulence adjustment region defined by the truncated triangular area BCGF. The turbulence decreases rapidly in the region of the turbulence decay, downstream of the turbulence adjustment region BCGF. Line BF is generally located downstream of the jet nozzle 70 a distance x≈4D, wherein x is the axial coordinate starting from the end of the jet nozzle 70 and D is the inner diameter of the jet nozzle 70. The position of line CG can be determined for example, as 10D or 20D according to different criteria. In FIG. 2, line CG is located at x≈10D. The entire truncated triangular area ACGE defines the jet noise major contribution volume, which is the major source of jet exhaust noise.

Figure 3:
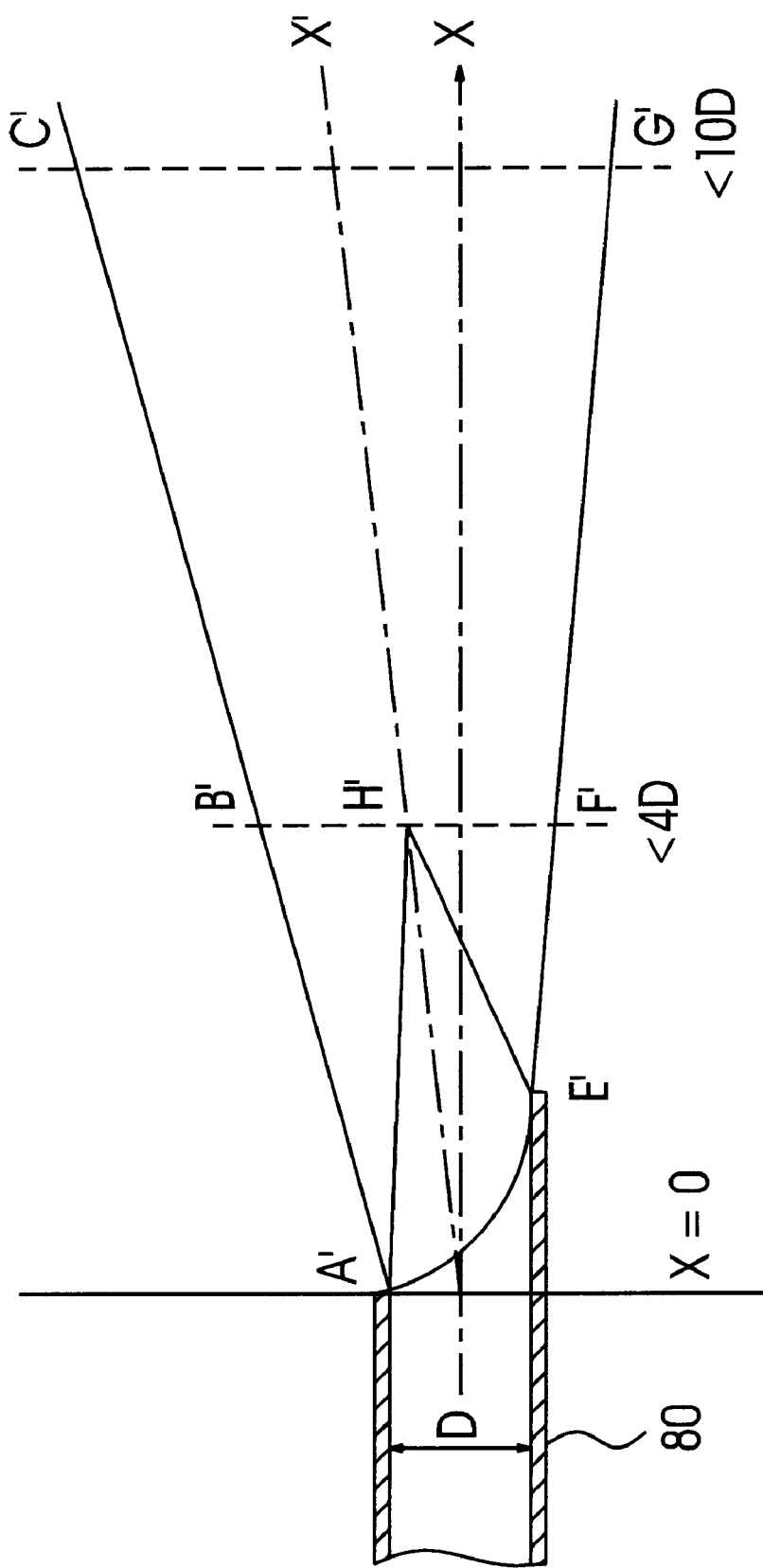
FIG. 3 is a schematic illustration, showing a downstream jet noise contribution volume of exhausted gases discharged from an engine exhaust end with an exhaust flow guide of the present invention.

FIG. 3 schematically illustrates the formation of a jet noise contribution volume of engine exhaust gases discharged from an asymmetrical engine nozzle 80 which is equivalent to the exhaust outlet 42, with the exhaust flow guide 60 attached, as shown in FIG. 1, to illustrate the present invention. In contrast to those in FIG. 2, the mixing regions A'B'H' and E'H'F', the jet core region A'H'E', and the turbulence adjustment region B' C'G'F' are deformed from shapes symmetrical about the axial line of the jet nozzle 80, as indicated by coordinate axis x, and become smaller. The axis x' which extends through the end point H' of the core region A'H'E' indicates the degree of the deformation. Generally, line B'F' is located at x<4D and line C'G' at x<10D when taking the same criteria to determine the boundary lines CG and C'G' between the turbulence adjustment region and the region of the turbulence decay in FIGS. 2 and 3 respectively. This is because the trailing edge of the nozzle 80 at which the viscous shearing of the two fluid flow layers occurs, is deviated from the symmetrical circular shape (as that of nozzle 70 shown in FIG. 2) to an asymmetrical trailing edge of the present invention. Furthermore, the total length of the trailing edge of the nozzle 80, including the side edges 68 and trailing edge 66 of the exhaust flow guide 60, as shown in FIG. 6a, is greater than the prior art symmetrical circular trailing edge of the nozzle 70 of FIG. 2, thereby resulting in a better mixing of the two fluid flow layers. As a final result, the jet noise major contribution volume A'C'G'E' is reduced accordingly.

Figure 4:
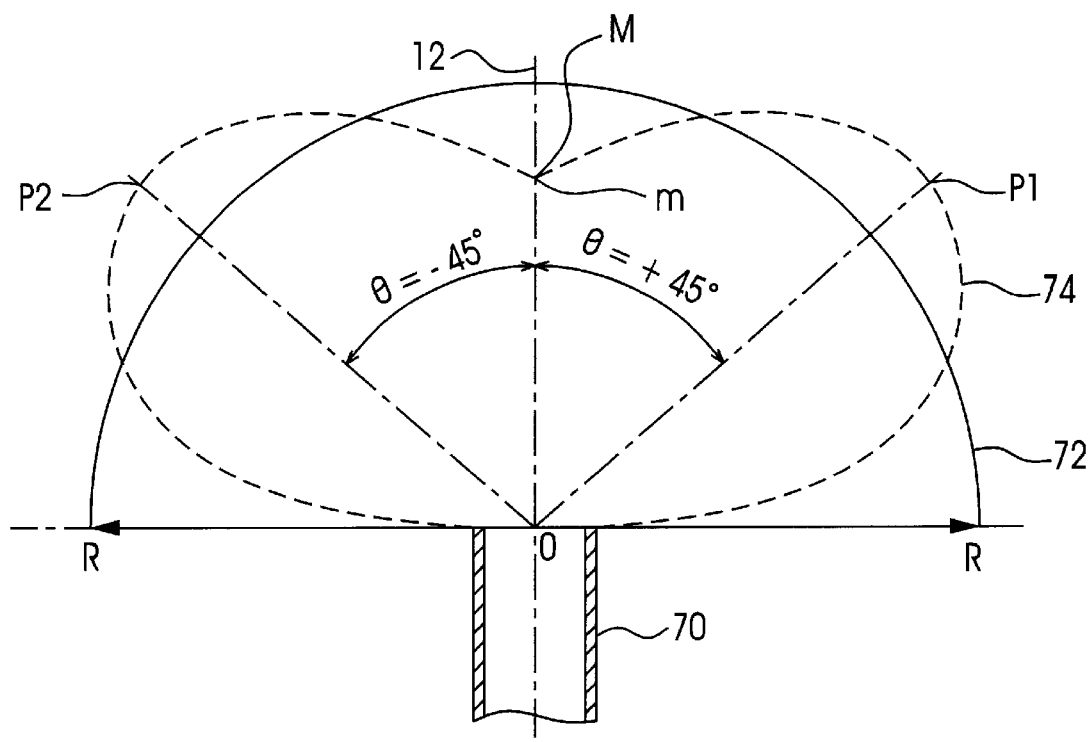
FIG. 4 is a schematic illustration, showing sound power levels of an aero-engine exhaust jet noise when the engine exhaust end does not have an exhaust flow guide attached thereto.

FIG. 4 shows a typical prior art jet noise spectrum relating to the downstream jet noise contribution volume of the engine exhaust gases shown in FIG. 2. The semi-circular line 72 represents angular locations spaced apart a constant distance R from the center point 0 of the outlet of the symmetrical exhaust nozzle 70. The curved broken line 74 represents sound pressure levels (dB) as a function of an angular location θ on the semi-circular line 72, which is referred to as directivity effect. For example, at point M of the intersection of the semi-circular line 72 and the center longitudinal line 12, at which θ=0, the sound pressure level (dB) is measured as a value m in this angular coordinate. The curved broken line 74 shows two peak sound pressure levels P1 and P2 identified at angular locations of approximately θ=+45° and θ=−45°.

Figure 5:
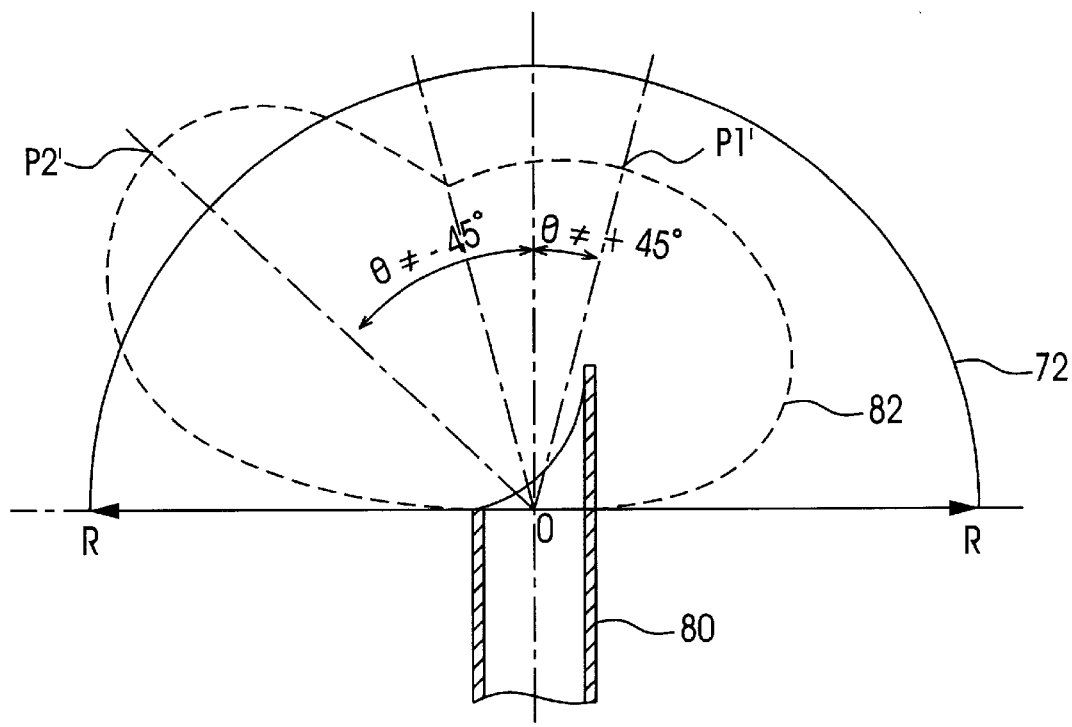
FIG. 5 is a schematic illustration, showing sound power levels of an aero-engine exhaust jet noise from the engine exhaust end with an exhaust flow guide of the present invention attached thereto.

FIG. 5 shows a jet noise spectrum relating to the downstream jet noise contribution volume of engine exhaust gases, according to the present invention, as shown in FIG. 3. It is apparent that the shape of the curved broken line 82 representing sound pressure levels is deformed from the symmetrical shape of curved line 74 shown in FIG. 4. The peak sound pressure levels P1' and P2', at the respective right hand section and left hand section of the curved broken line 82 are deviated away in a counter-clockwise direction from the +45° and −45° angular positions, respectively. The volume of the peak sound pressure level P1' of the right-hand section of the curved broken line 82, is lower relative to the volume of the peak sound pressure level P1 of the right-hand section of the curved broken line 74 shown in FIG. 4. This is a direct result of the smaller and deformed jet noise contribution volume shown in FIG. 3 with respect to the jet noise contribution volume shown in FIG. 2.

In conclusion the exhaust flow guide 60 as shown in FIGS. 1 and 6a can be attached to an engine exhaust end to change the noise directivity and reduce noise pressure levels in the desired direction. It is generally desirable to reduce noise pressure levels toward the ground. Thus, the exhaust flow guide 60 is preferably positioned circumferentially at an underside of the inner periphery of the engine exhaust outlet 42 when the gas turbine engine 10 is installed in an aircraft. However, it can be rotated to an optimized position to minimize aircraft noise certification levels.

Figure 6A:
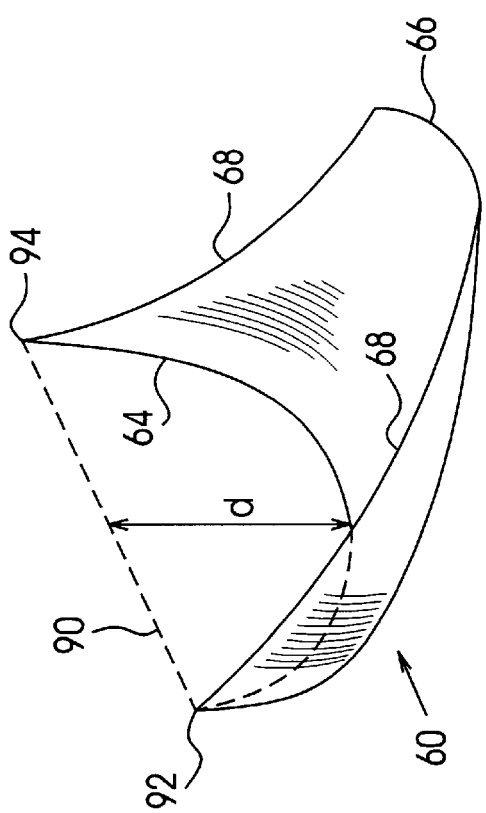
Figure 7:
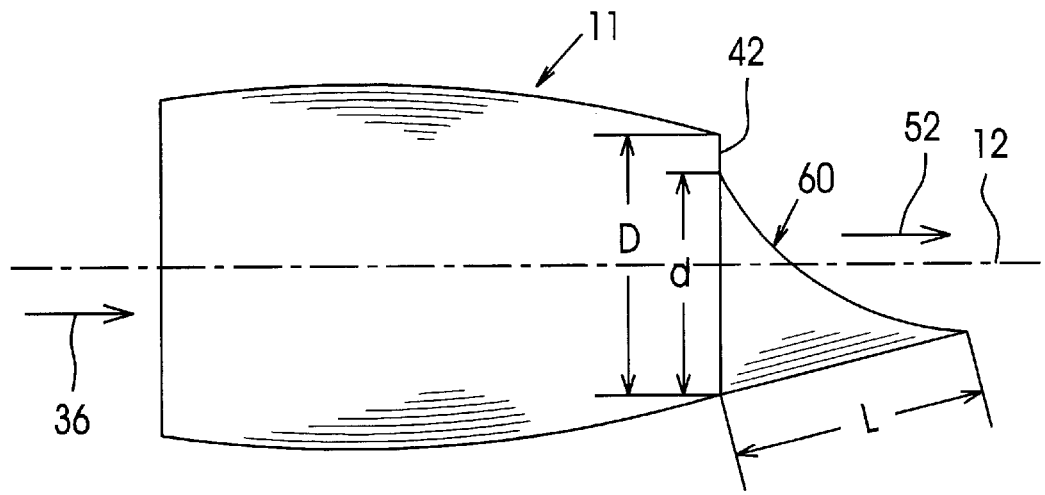
FIG. 7 is a schematic side view of a gas turbine engine having a long cowl nacelle, incorporating the present invention.

The piece of sheet metal forming the exhaust flow guide 60 can be trapezoidal or triangular in shape. In the case of the latter, the length of the trailing edge 66, as shown in FIG. 6a, of the exhaust flow guide 60 is reduced to a point, as shown in FIG. 7. Nevertheless, the exhaust flow guide 60 is required to have certain dimensions relative to the engine exhaust outlet 42 in order to effectively and asymmetrically affect the downstream jet noise contribution volume of the engine exhaust gases. As shown in FIG. 6a, the distance d from a center point of the curved leading edge 64 to an imaginary straight line 90 extending between two circumferentially opposed extremities 92, 94 of the curved leading edge 64, is greater than one quarter of the diameter D of the inner periphery of the exhaust outlet 42 of the engine 10 (see FIG. 7), that is, $0.25 \leq d/D \leq 1$. Also, as shown in FIG. 7, the distance L between the curved leading edge and the curved trailing edge of the exhaust flow guide 60 is not smaller than 0.3 of the diameter D of the inner periphery of the exhaust outlet 42 of the engine 11, that is, $L/D \geq 0.3$.

Figure 8:
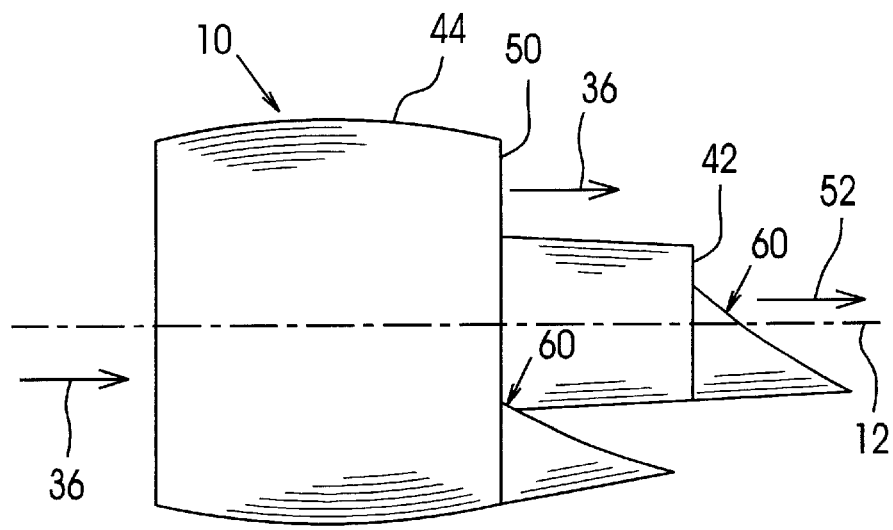
FIG. 8 is a schematic side view of a gas turbine engine having a short cowl nacelle incorporating another embodiment of the present invention.

The embodiment of the present invention shown in FIG. 8 includes a second exhaust flow guide 60 which is attached to the outlet 50 of the nacelle 44 at the underside in a manner similar to the attachment of an exhaust flow guide 60 attached to the engine exhaust outlet 42, to effectively and asymmetrically guide the annular bypass air flow 36. Similar to the illustration shown in FIG. 5, the principle of changing jet noise directivity and reducing its power level is applied thereto.

Figure 9:
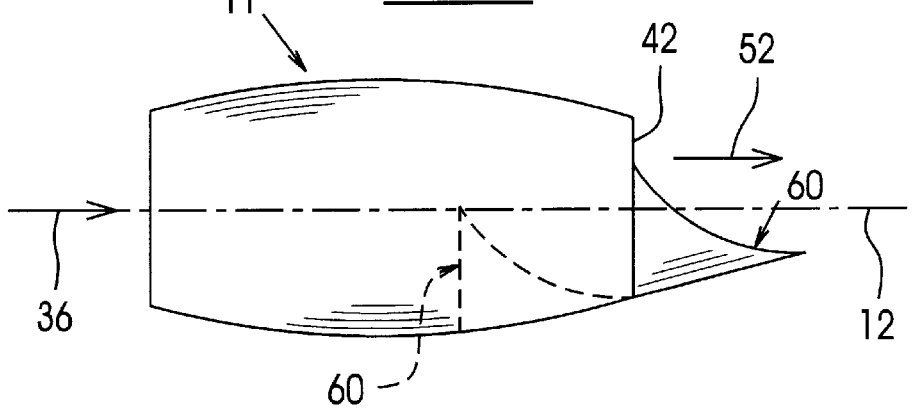
FIG. 9 is a schematic side view of a gas turbine engine similar to that in FIG. 7, showing a retractable exhaust flow guide device relative to the exhaust end of the engine.

The exhaust flow guide 60 used in the embodiment of the present invention shown in FIG. 7 is retractably attached to the engine exhaust outlet 42 of the engine 11. The exhaust flow guide 60 is adapted to be extended rearwardly and outwardly from the engine exhaust outlet 42, as shown in FIG. 9, to the operative position shown in solid lines and is adapted to be retracted into the inside of the engine 11 as shown in broken lines by well known actuation means. The exhaust flow guide 60 may be attached to the engine exhaust outlet 42 rotatably about the central longitudinal axis 12 (see FIG. 1) so that the circumferential position of the exhaust flow guide 60 with respect to the exhaust outlet 42 can be adjusted when required.

Additional features may be added to the exhaust flow guide 60 according to various embodiments of the present invention in order to optimize the overall jet noise reduction.

Figure 6B:
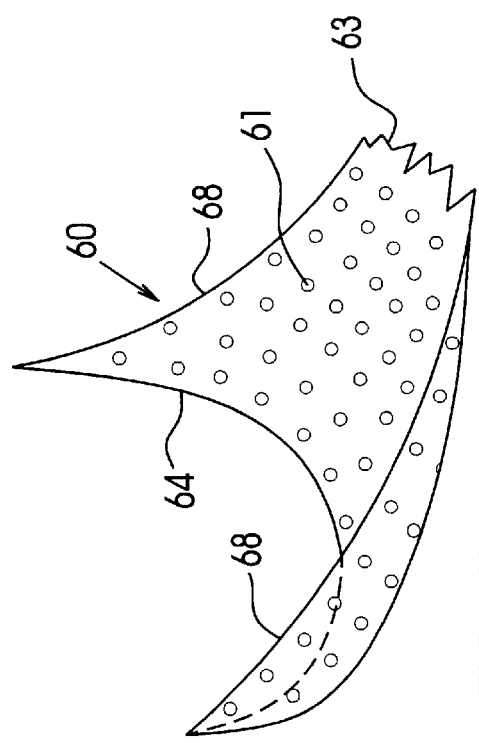
FIGS. 6a through 6d are perspective views of exhaust flow guide devices according to various embodiments of the present invention.
Figure 6D:
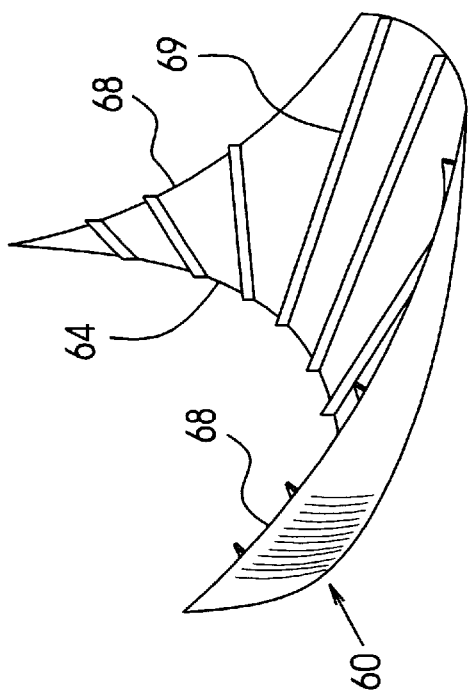

The embodiment of the exhaust flow guide 60 shown in FIG. 6b includes perforations 61 which are formed in the curved sheet metal, preferably in a staggered pattern. It is noted, as shown in FIG. 1, that the combustion gases 52 discharged from the outlet 42 of the engine 10 and the bypass air flow 36 discharged from the outlet 50 of the bypass duct 55, have different velocities, temperatures and pressures. The pressure difference between one side and the other side of the perforated exhaust flow guide 60 (see FIG. 6b) causes fluid flow across the piece of curved sheet metal through the perforations 61, which enhances the mixing of combustion gases 52 discharged from the outlet 42 of the engine 10 with the bypass air flow 36 discharged from outlet 50 of the bypass duct 55.

Furthermore, the exhaust flow guide 60 illustrated in FIG. 6b includes a toothed trailing edge 63 which is an irregular trailing edge with a plurality of tooth-like elements in different shapes and sizes, unevenly distributed along the trailing edge. All of the tooth-like members generally extend rearwards. The toothed trailing edge 63, in contrast to the smooth trailing edge 66 of the exhaust flow guide 60, shown in FIG. 6a, effectively increases the peripheral length of the mixing boundary, thereby resulting in better mixing of the two fluid streams to be mixed. For an overall effect, the perforated exhaust flow guide 60 with the toothed trailing edge 63 enhances the mixing of the combustion gases 52 and bypass air flow 36 to effectively reduce the downstream jet noise contribution volume of the engine exhaust gases, resulting in further reduction of aero-engine exhaust jet noise.

Figure 6C:
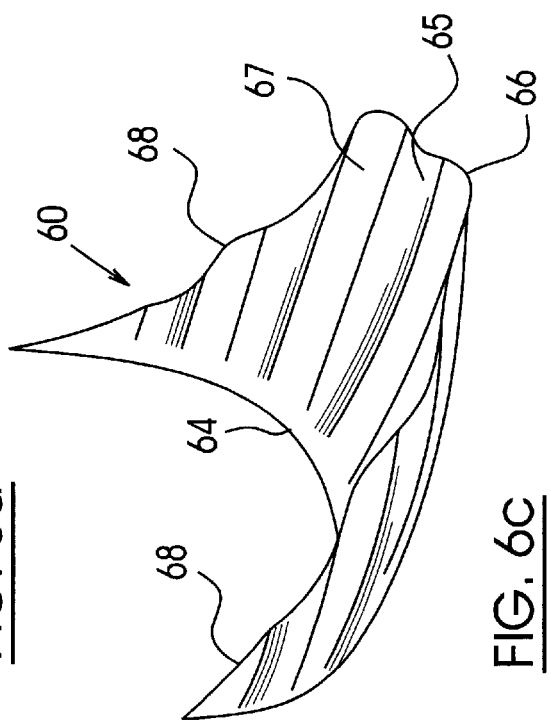

The embodiment of the exhaust flow guide 60 shown in FIG. 6c is made of a curved sheet metal which is corrugated to form longitudinal ridges 65 and troughs 67 thereon. The local flow area variations created by the ridges 65 and troughs 67 produce local control of pressure gradients and allow the boundary layer approaching an adverse pressure gradient region to move laterally instead of separating from the sheet metal surface. It is believed that as the boundary layer flows downstream and encounters a ridge 65, it thins out along the top of the ridge 65 and picks up lateral momentum on either side of the peak of the ridge 65 toward the troughs 67. In corresponding fashion, the boundary layer flowing into the trough 67 is able to pick up lateral momentum and move laterally on the surfaces of the trough 67 on either side thereof. The net result is the elimination of two-dimensional boundary layer separation because the boundary layer is able to run around the pressure rise as it moves toward the trailing edge which includes the trailing edge 66 and the side edges 68. This also produces a better mixing of the two flow layers, thereby resulting in a better jet noise reduction. Additionally, the corrugated structure reinforces the mechanical strength of the exhaust flow guide 60.

The embodiment of the exhaust flow guide 60 shown in FIG. 6d includes a plurality of reinforcement strips 69 extending on an inner surface of the sheet metal from the curved leading edge 64 and in a radiant pattern. The strips 69 reinforce the mechanical strength of the exhaust flow guide 60, and produce an effect similar to the ridges 65 of the exhaust flow guide 60 of FIG. 6c. Additionally, the strips 69 in the radiant pattern further create local flow variations by deviating the local flow along the inner surface of the sheet metal from the axial direction, which also improves the mixing of the two fluid flow layers, thereby reducing the jet noise.

The additional features added to the exhaust flow guide 60, of FIG. 1, according to the various embodiments of the present invention can be used in different combinations for an optimal jet noise reduction.

Moreover, the exhaust flow guide 60 is not only able to reduce the jet noise generated by the downstream jet noise contribution volume of the engine exhaust gases discharged from the engine exhaust end, but also effects other engine noise reduction. In addition to the exhaust jet noise, several other noise components produced by the engine are generally embedded in the combustion gases 52 discharged from the exhaust outlet 42 of the engine. For example, the turbine blade-passing frequency tone and any shock noise that may be generated can be reduced by the presence of the perforated flow guide.

Another noise component, particularly in the engine 11 having a long cowl nacelle, as shown in FIG. 7, is the fan noise propagating outwards and emitting outwards from the engine exhaust end. These embedded core noise and fan noise in the combustion gases 52, discharged from the engine exhaust end will be inhibited by the exhaust flow guide 60, which acts as a noise shield, from propagation towards the ground and will also be partially attenuated by the perforations in the exhaust flow guide 60.

Modifications and improvements to the above-described embodiments of the present invention may become apparent to those skilled in the art. The forgoing description is intended to be exemplary rather than limiting. The scope of the present invention is therefore, intended to be limited solely by the scope of the appended claims.

I claim:

1. A gas engine exhaust jet noise reduction device for a gas turbine engine having an exhaust end, the device comprising an exhaust flow guide adapted to be attached to the exhaust flow guide, the exhaust flow guide having a piece of sheet metal curved to form a partial portion of a nozzle having curved leading and trailing edges, and side edges, the curved leading edge having a circumferential length greater than a circumferential length of the curved trailing edge, a distance from a central point of the curved leading edge to an imaginary straight line extending between two circumferentially opposed extremities of the curved leading edge being greater than one quarter of a diameter of an inner periphery of the exhaust end, thereby asymmetrically guiding an exhaust flow to change a jet noise directivity and reduce jet noise power level.

2. The gas engine exhaust jet noise reduction device as claimed in claim 1 wherein a distance between the curved leading edge of the exhaust flow guide and the curved trailing edge of the exhaust flow guide is not smaller than 0.3 of the diameter of the inner periphery of the exhaust end.

3. The gas engine exhaust jet noise reduction device as claimed in claim 1 wherein the piece of sheet metal is trapezoidal.

4. The gas engine exhaust jet noise reduction device as claimed in claim 1 wherein the piece of sheet metal is triangular and thereby the length of the trailing edge being reduced to a point.

5. The gas engine exhaust jet noise reduction device as claimed in claim 1 wherein the curved sheet metal forms a partial portion of a cylindrical nozzle.

6. The gas engine exhaust jet noise reduction device as claimed in claim 1 wherein the curved sheet metal forms a partial portion of a truncated conical nozzle.

7. The gas engine exhaust jet noise reduction device as claimed in claim 1 wherein the exhaust flow guide comprises a trailing edge deviated from a straight line in a circumferential direction of the partial portion of the nozzle.

8. The gas engine exhaust jet noise reduction device as claimed in claim 1 wherein the trailing edge is a toothed edge in an asymmetrical pattern.

9. The gas engine exhaust jet noise reduction device as claimed in claim 1 wherein the curved sheet metal comprises perforations for fluid communication between regions at both sides of the sheet metal, thereby resulting in fluid flow across the sheet metal to enhance mixing of engine exhaust gases with a surrounding fluid flow.

10. The gas engine exhaust jet noise reduction device as claimed in claim 1 wherein the curved sheet metal is corrugated to form alternating longitudinal ridges and troughs thereon.

11. The gas engine exhaust jet noise reduction device as claimed in claim 1 wherein the curved sheet metal comprises a plurality of reinforcement strips extending on an inner surface thereof from the curved leading edge in a radiant pattern.

12. A gas turbine engine for aircraft including an engine exhaust end, the gas turbine engine comprising an exhaust flow guide made of a piece of sheet metal attached to and extending rearwards from the engine exhaust end, the sheet metal being curved about a central longitudinal axis of the engine to form a partial portion of a nozzle having curved leading and trailing edges, and side edges, the curved leading edge having a circumferential length greater than a circumferential length of the trailing edge, a distance from a central point of the curved leading edge to an imaginary straight line extending between two circumferentially opposed extremities of the curved leading edge being greater than one quarter of a diameter of an inner periphery of the exhaust end, thereby asymmetrically guiding exhaust flow to change a jet noise directivity and reduce jet noise power level.

13. The gas turbine engine as claimed in claim 12 wherein the exhaust flow guide is positioned circumferentially at an underside of the inner periphery of the exhaust end when the gas turbine engine is installed in the aircraft.

14. The gas turbine engine as claimed in claim 12 wherein the exhaust flow guide is formed in a shape and attached to the exhaust end, forming a smooth continuation of a nacelle exhaust nozzle of the gas turbine engine.

15. The gas turbine engine as claimed in claim 12 wherein the exhaust flow guide is retractable into an inside of a nacelle exhaust nozzle of the gas turbine engine.

16. The gas turbine engine as claimed in claim 12 wherein the exhaust flow guide is rotatable about the central longitudinal axis with respect to the exhaust end.

17. The gas turbine engine as claimed in claim 12 wherein an exhaust flow guide similar to the exhaust flow guide attached to the engine exhaust end is attached to a fan bypass nacelle outlet to asymmetrically affect bypass air flow discharged from the fan bypass nacelle outlet.

18. A method for reducing jet noise of gas turbine engines comprising a step of changing jet noise directivity and reducing jet noise power levels using an exhaust flow guide made of a curved sheet metal attached to an engine exhaust end to form a partial portion of a nozzle to asymmetrically affect viscous shearing of rapidly moving exhaust gases into a relative quiescent surrounding fluid flow at the boundary between the exhaust gases and the surrounding fluid flow.

19. A method as claimed in claim 18 further comprising a step of using a similar exhaust flow guide attached to a nacelle outlet of a fan bypass type engine when the nacelle outlet is located upstream of the exhaust end, thereby asymmetrically affecting viscous shearing of rapidly moving bypass air flow into a relative quiescent surrounding atmosphere at the boundary between the exhaust gases and the atmosphere.

20. The method as claimed in claim 19 wherein the exhaust flow guides are attached to the respective exhaust end and the nacelle outlet at an underside thereof when the gas turbine engine is installed in an aircraft.

* * * * *